United States Patent [19]

Castelein

[11] Patent Number: 4,464,439
[45] Date of Patent: Aug. 7, 1984

[54] CO-EXTRUDED LAMINATE CONSISTING OF AT LEAST ONE SHEET OF POLYPROPYLENE AND AT LEAST ONE SHEET OF POLYMERIC MATERIAL BASED ON HIGH-IMPACT POLYSTYRENE

[75] Inventor: Jean Castelein, Mellery, Belgium

[73] Assignee: Montefina S.A., Belgium

[21] Appl. No.: 356,658

[22] Filed: Mar. 10, 1982

[30] Foreign Application Priority Data

Mar. 12, 1981 [IT] Italy .................. 20313 A/81

[51] Int. Cl.³ .......................................... B32B 27/08
[52] U.S. Cl. .................................. 428/517; 428/516; 428/35; 525/98; 525/71; 156/244.11
[58] Field of Search ........................ 525/98, 71, 96; 428/517, 521; 156/244.11

[56] References Cited

U.S. PATENT DOCUMENTS

| 4,031,166 | 7/1977 | Bronstert et al. | 525/98 |
| 4,111,349 | 9/1978 | Buckler et al. | 428/517 |
| 4,133,923 | 1/1979 | Blunt | 525/98 |
| 4,197,377 | 4/1980 | Böhm et al. | 525/98 |
| 4,292,355 | 9/1981 | Bonis | 428/517 |
| 4,386,187 | 5/1983 | Grancio et al. | 525/96 |

Primary Examiner—George F. Lesmes
Assistant Examiner—E. Rollins Buffalow

[57] ABSTRACT

Thermoplastic laminate suited for thermo-forming, consisting of at least one sheet of crystalline polypropylene and of at least one sheet of polymeric material consisting of a mixture of high-impact polystyrene (from 1% to 75% by weight), crystalline polypropylene (from 20% to 85% by weight) and of styrene/dienic monomer block copolymer with three or more sequences (from 5% to 15% by weight).

4 Claims, No Drawings

CO-EXTRUDED LAMINATE CONSISTING OF AT LEAST ONE SHEET OF POLYPROPYLENE AND AT LEAST ONE SHEET OF POLYMERIC MATERIAL BASED ON HIGH-IMPACT POLYSTYRENE

THE PRESENT INVENTION

Object of the present invention is that of realizing a thermoplastic laminate particularly suited for "vacuum forming", and having a composite structure consisting of at least one sheet of crystalline polypropylene and at least one sheet of a polymeric material obtained by mixing together high-impact polystyrene with crystalline polypropylene and with a styrene/dienic monomer block copolymer wherein the dienic monomer is either butadiene or isoprene.

The mixture shall contain from 1% to 75% by weight (preferably from 45% to 55%) of high-impact polystyrene, from 20% to 85% by weight (but preferably from 40% to 50%) of polypropylene and from 5% to 15% by weight (but preferably 10%) of a copolymer in blocks.

The sheet based on crystalline polypropylene may also be constituted of a mixture containing up to 15% by weight of the above cited styrene/diene copolymer in blocks.

By the term "crystalline polypropylene" is meant the polypropylene obtained by means of stereospecific catalysts, having an isotacticity index of at least 90 (determined as a residue of the extraction with boiling n-heptane, expressed in % by weight).

The laminate is obtained by a co-extrusion process of the polymeric materials forming the two or more composing layers. The co-extrusion process is achieved on a conventional equipment for such an operation.

The extrusion temperature lies around 210° C. for the polymeric material based on high impact polystyrene and around 200° C. for the polypropylene.

The extruded material coming out of the slot-shaped nozzle is passed through a multi-roll calander, at a controlled roll temperature of between 20° C. and 95° C.

The coextrusion of the two types of polymeric materials, according to the invention, may be used also in the production of extruded films. In this case there will be provided a suitable device for the stretching of the extruded material coming out of the extruding nozzle.

The block coplymer styrene/diene is an elastomeric copolymer of the type with three or more sequences, having structure S—(D—S)$_n$ in which n is an integer, preferably 1, S=styrene, D=diene chosen from between butadiene and isoprene, having a content in styrene lower than 50% by weight. The copolymers of this type are well known to the Prior Art and, for instance, are described in U.S. Pat. Nos. 3,149,182 and 3,390,207.

In general they are obtained by means of anionic polymerization in a solvent with a polymerization catalyst of the type metal-alkyl, such as e.g. lithium-alkyls.

The achievement of a coextruded laminate absolutely free of breaking-off phenomena or the detachment of the composing sheets, is the result of the specific combination of the above indicated polymeric materials.

In fact, it has been observed that, if instead of the polymeric compositions based on polystyrene, there is used an analogous one not containing polypropylene, there is no adhesion to the co-extruded polypropylene or polypropylene+10% S—B—S copolymer sheet. Analogously, a polymeric composition based on polystyrene such as the one used in the process according to this invention, does not show a fast adherence to the co-extruded high-impact polystyrene or crystalline polystyrene sheet.

CHARACTERISTICS OF THE CO-EXTRUDED LAMINATE.

The laminate obtained according to this invention consists of an assembly of two or more sheets perfectly welded together to each other. Such a laminate may be bent, folded or rolled up into rolls or shaped (formed) in various ways without suffering any breaking-off of the component sheets.

This laminate is particularly suited for use in forming processes under vacuum: thereby it is possible to obtain formed bodies of a circular cross section having a depth/diameter ratio in the drawing that may reach 22, without the occurrence of any detachment of the component sheets.

The laminate according to this invention is particularly suited for the production of containers for foodstuffs; in this case the polypropylenic layer forms the internal surface of the container in contact with the food, thus avoiding the drawbacks that would be met with if the foodstuff would be put into contact with the polystyrene-based polymeric material.

It is quite known that, because of its characteristics of resistance to oils and fats, polypropylene is particularly suited for use in this specific field. At the same time, the laminate according to this invention has processability characteristics quite superior to those of polypropylene. In particular, the forming speed is close to that of the polymeric materials based on polystyrene.

EXAMPLE 1

A polymeric composition was prepared by mixing together 45 parts by weight of high-impact polystyrene (HIPS), 45 parts by weight of polypropylene (PP) and 10 parts by weight of block-copolymers SBS containing 28% by weight of styrene, having a "melt flow index" of 6 g/10 minutes, known on the market by the name of "Cariflex TR-1102", produced by Shell Co.

This polymeric material was co-extruded with a crystal line polypropylene (PP), on a screw extruder with a screw of 60 mm diameter and on a co-extruder with a screw of 45 mm diameter, both having a L/D ratio=32.

The extrusion conditions for the polymeric material based on styrene were:

| (Operational conditions for HIPS): | |
|---|---|
| Heating of the plasticizing chamber, zone 1: | 165° C. |
| Heating of the plasticizing chamber, zone 2: | 180° C. |
| Heating of the plasticizing chamber, zone 3: | 190° C. |
| Heating of the plasticizing chamber, zone 4: | 200° C. |
| Heating of the plasticizing chamber, zone 5: | 200° C. |
| Temperature of exchanger of filter: | 200° C. |
| Temperature of static mixer: | 215° C. |
| Pressure in the extrusion head: | 80 Kg/cm$^2$ |
| Temperature of molten mass: | about 220° C. |
| Revolving speed of extrusion screw: | abt. 65 rev./min. |
| Operational conditions for P.P.: | |
| Heating of plasticizing chamber, zone 1: | 180° C. |
| Heating of plasticizing chamber, zone 2: | 185° C. |
| Heating of plasticizing chamber, zone 3: | 200° C. |
| Heating of plasticizing chamber, zone 4: | 205° C. |
| Heating of plasticizing chamber, zone 5: | 210° C. |
| Temperature of filter exchanger | 200° C. |
| Temperature of static mixer | 200° C. |
| Pressure in the extrusion head | 80 Kg/cm$^2$ |
| Temperature of molten mass | 203° C. |
| Speed of extrusion screw | 65 rev./min. |

-continued

| Nozzle: | |
|---|---|
| temperature | 200° C. |
| width of slot: | 0.8 mm |
| Calander: | |
| 1st roller, ⌀ 347 mm | 70° C. |
| 2nd roller, ⌀ 347 mm | 85° C. |
| 3rd roller, ⌀ 347 mm | 85° C. |
| 4th roller, ⌀ 238.4 mm | 20° C. |
| 5th roller, ⌀ 238.4 mm | 20° C. |

There was obtained a laminate whose two layers of polymeric material were perfectly welded together. There did not occur any detachment when subjecting the laminate to bending tests such, for instance, by rolling it up to coil.

Thermo-forming tests

The thermoforming machine was of the OMV F 425 type, with Infrared heaters on both sides of the sheet. The upper heater has 6 longitudinal rows of infrared heating elements, separately adjustable.

The lower heater had only 5 of such rows.

The mold was a 4-cavity die for small cups:

| upper diameter | 94 mm ⌀ |
|---|---|
| lower diameter | 81 mm ⌀ |
| depth | 58 mm |
| Operational conditions: | |
| Upper heater | 410° C. |
| Lower heater | 410° C. |
| Cooling of the mold | 10° C. |
| Molding speed | 36 shots per min. |

The multi-layer laminate, thanks to its polystyrene component, may be brought up, without difficulty, to a temperature above the melting point of the polypropylene, thereby facilitating the thermo-forming of the laminate.

The molded pieces showed an excellent distribution of the material and excellent mechanical properties. No scaling off or detachment occurred.

EXAMPLE 2

A polymeric composition based on HIPS, PP and a S—B—S copolymer was prepared as in example 1, and was then coextruded with a mix of 20 p.p. of PP and 10 p.p. of block copolymer S—B—S of the type described in example 1.

The working conditions for the preparation of the co-extruded laminate were the same as those described in example 1. The laminate thus obtained consisted of two sheets perfectly welded together.

The mechanical characteristics and the processability properties are similar to those found for the co-extruded laminate of example 1.

The thermo-forming test yielded similar results.

What is claimed is:

1. A thermoplastic laminate, suitable for thermo-forming, of a composite structure consisting of at least one sheet of crystalline polypropylene and of at least one sheet of polymeric material consisting of a mixture containing 45% to 55% by weight of high-impact polystyrene (HIPS), from 40% to 45% by weight of crystalline polypropylene and from 5% to 15% by weight of styrene/dienic monomer tri-block copolymer, in which the dienic monomer is butadiene or isoprene, with a structure of at least 3 sequences and represented by the formula S—(D—S)$_n$ wherein $n$ is an integer, S=styrene, D=butadiene or isoprene, having a content in styrene lower than 50% by weight, said laminate being obtained through the co-extrusion of the different polymeric materials constituting the single individual sheets and by the successive calandering together of the co-extruded sheets.

2. A thermoplastic laminate according to claim 1, characterized in that the sheet of crystalline polypropylenic material consists of a crystalline polypropylene mixed together with a quantity of not more than 15% by weight of the styrene/dienic monomer tri-block copolymer as defined in claim 1.

3. Containers for foodstuffs, obtained by thermo-forming the laminate of claim 1, and in which containers the inner side in contact with the product consists of the polypropylenic layer.

4. A thermoplastic laminate according to claim 1, in which, in the formula S—(D—S)$_n$, $n$ is 1.

* * * * *